(12) United States Patent
Sanders et al.

(10) Patent No.: US 6,754,487 B1
(45) Date of Patent: Jun. 22, 2004

(54) RADIO NETWORK TEST ANALYSIS SYSTEM

(75) Inventors: Alan David Sanders, Atlanta, GA (US); Perry Simon Lewars Linder, Chevy Chase, MD (US); Thomas Gregory Pratt, Covington, GA (US); Anthony Jerome Dickherber, Atlanta, GA (US); Timothy Scott Floyd, Atlanta, GA (US); Leslie Westhaver Pickering, Atlanta, GA (US)

(73) Assignee: Telecom Network Optimization, Inc., Atlanta, GA (US)

( * ) Notice: Subject to any disclaimer, the term of this patent is extended or adjusted under 35 U.S.C. 154(b) by 723 days.

(21) Appl. No.: 09/638,921

(22) Filed: Aug. 15, 2000

Related U.S. Application Data

(60) Provisional application No. 60/185,590, filed on Feb. 28, 2000.

(51) Int. Cl.[7] .................................................. H04Q 7/20
(52) U.S. Cl. ..................... 455/423; 455/425; 455/67.11; 455/226.1
(58) Field of Search ................................ 455/423, 424, 455/425, 434, 524, 525, 67.11, 161.1, 161.2, 226.1–226.4, 229; 375/254, 285, 343, 347, 350, 349

(56) References Cited

U.S. PATENT DOCUMENTS

| | | | | |
|---|---|---|---|---|
| 5,724,657 A | * | 3/1998 | Lin et al. ..................... | 455/423 |
| 5,867,786 A | * | 2/1999 | Ishi .............................. | 455/436 |
| 5,970,102 A | * | 10/1999 | Hwang ........................ | 375/340 |
| 6,101,383 A | * | 8/2000 | Poon ............................ | 455/425 |
| 6,122,327 A | * | 9/2000 | Watanabe et al. ........... | 375/316 |
| 6,308,068 B1 | * | 10/2001 | Kunkel ........................ | 455/434 |
| 6,466,767 B1 | * | 10/2002 | Lidbrink et al. ........... | 455/67.11 |
| 2001/0044322 A1 | * | 11/2001 | Raaf ............................ | 455/561 |

* cited by examiner

*Primary Examiner*—Vivian Chin
*Assistant Examiner*—Tuan Tran
(74) *Attorney, Agent, or Firm*—Troutman Sanders LLP; James E. Schutz; Ryan A. Schneider

(57) ABSTRACT

Optimization of a cellular network is facilitated by an apparatus that performs drive test measurements of a cellular network to identify co-channel interference. The co-channel interference is identified by measuring the signal strengths at various locations within a cell sector and analyzing the recorded information. A key aspect of the invention is synthesizing the received signals to identify the cellular transmitters originating the signals. If signal energy is detected from more than one cellular transmitter on a single frequency, the co-channel interference is identified. This process is particular well suited within a GSM cellular system by detecting the transmission of forward control channel messages and using the information within the forward control channel messages to identify the origination cellular transmitters.

13 Claims, 6 Drawing Sheets

RADIO NETWORK TEST ANALYSIS SYSTEM

RELATED APPLICATIONS

This application is based on and claims the priority date of U.S. Provisional Application Serial No. 60/185,590, entitled "RADIO NETWORK TEST ANALYSIS SYSTEM", filed on Feb. 28, 2000.

TECHNICAL FIELD

The present invention relates to the field of telecommunication network design and analysis, and in particular, the optimization and planning of frequency reuse based telecommunication networks by performing a signal presence analysis.

BACKGROUND OF THE INVENTION

The origins of mobile radio telephony extend as far back as the early 1920's when the Detroit Police Department instituted a police dispatch system using a frequency band near 2 Mhz. This early system was such a huge success that the channels in the allocated bandwidth were soon filled to capacity. It quickly became necessary for the Federal Communications Commission ("FCC") to open additional channel capacity. In 1934 the FCC responded by opening up channel capacity in the 30–40 MHz range. By the early 1040's, a large number of law enforcement and emergency agencies were utilizing mobile radios. In the late 1940's, the FCC made mobile radio service available to the private sector.

These early systems were based on a single, high-powered transmitter-receiver servicing a single geographic area. Each channel within the system could only support a single conversation at a time. With the popularity of the service and the limited number of channels available for a given area, the quality of service was not acceptable—especially in the law enforcement and emergency service sectors. Finally, in the 1970's, the FCC in cooperation with industry leaders, developed a system architecture which gave birth to today's cellular telephony systems.

A cellular telephony system is a high-capacity, mobile radio system in which the frequency spectrum is divided into discrete channels which are assigned in groups to small geographic regions. A cellular transmitter-receiver within a geographic region communicates with cellular radios within the same geographic region using the discrete channels assigned to that geographic region. The key aspect of cellular telephony systems is that the transmitted power of the signals on a cellular channel are limited so as to enable the re-use or reassignment of the cellular channels to another geographic region that is a minimum distance away from other geographic regions using the same cellular channels.

Today, several competing cellular telephony standards are in operation as well as development. Some of these systems include the Analog Mobile Phone System (AMPS), Narrowband Analog Phone System (N-AMPS), TDMA, GSM, CDMA, Edge, 3G, and PCS. Although the technology utilized in each of these systems can be quite varied, a common problem that arises is the optimization and layout of the cellular network.

A cellular telephony system divides a service area into a series of geographic regions or cells. Within each geographic region, a transmitter-receiver tower is established to cover that geographic region. Much research and testing has been performed in identifying optimal design for cellular systems. The utilization of bandwidth within a cellular system is maximized by maximizing the reassignment of the cellular channels within the system. However, reusing cellular channels without having enough geographic separation may result in co-channel interference. To minimize co-channel interference, the reassignment of cellular channels within a system must be minimized. Thus, there is a need in the art for a system and a method for optimizing the configuration of a cellular telephony system that balances the minimization of co-channel interference with the maximization of bandwidth utilization.

In an ideal situation, the most optimal structure is to use hexagonal shaped cells that have an axis included to each other at a sixty degree angle. Given particular cell sizes and transmit powers for each transmitter-receiver, the distance necessary to separate cells that utilize the same set of cellular channels can easily be calculated. However, once you step away from the chalk board and enter the real world, one that is plagued by buildings, foliage, humidity, uneven terrain, and a host of other parameters, the chalk board calculations don't always provide optimum performance of the cellular telephony system. It would be exceedingly difficult to attempt to optimize the layout of a cellular system based on each of the possible parameters that effect its operation on paper. Thus, to optimize the layout of a cellular system, it is necessary to take signal measurements in the field. However, this can also be a tremendous task depending on the size of the cellular system, the terrain, and the resources available to the system operator. Thus, there is a need in the art for a system and a method to simplify the task of obtaining and analyzing field signal measurements of a cellular system.

As previously mentioned, optimizing a cellular system includes limiting co-channel interference. A problem associated with signal measurements taken in the field is distinguishing between valid channels and interfering channels. If the source of a signal cannot be identified (i.e., the transmitting cell tower) then the determination of co-channel interference cannot be accomplished. Thus, there is a need in the art for a system and a method for identifying interference problems due to co-channel interference within a cellular telephony system.

A current technique that is being employed by service providers of cellular systems includes performing a drive test within the footprint of the cellular system to measure the received signal strength at various locations within the cellular system. In addition, the service provider predicts the performance of the cellular system using a network model, typically based on mathematical analysis. Invariably the measured and predicted performance characteristics of the system are different. The service providers then perform adjustments to the system to improve the performance. They utilize these adjustments as inputs into the performance prediction process to determine the improvements in the performance of the cellular system. Any performance improvements identified during this analysis are assumed to be proportionately attributed to the measured performance of the system. This type of system is very prone to error. The average error for systems utilizing similar methodologies range from 9 to 12 dB. While this is marginally acceptable for a non-operating network, it is completely unacceptable for a system that is currently in operation. GSM networks, in normal operation, involve operation changes which may affect the network performance. Despite this, this corrected predicted data is still the main input for the frequency planning and capacity maximization process.

Thus, although this technique may result in providing some performance enhancements to the cellular system, the improvements are uncertain, unverified, and inaccurate. Thus, there is a need in the art for a system and method to more accurately ascertain the actual operational characteristics of a cellular system before and after performing optimization adjustments.

Dedicated communication channels within a GSM system are managed through a time division multiplexing technique. The GSM standard defines traffic channels (TCH) that are used to carry information intended for a user. Each traffic channel is associated with another channel used for signaling. It also is a dedicated channel is called the slow associated control channel (SACCH). Three broadcast channels are available in the GSM system. The broadcast control channel (BCCH) is used to send various system parameters to all mobile stations. These parameters include the operator identifies, the location of the cell, the name of the cell, frequency information, and the like. The frequency correction channel (FCCH), is used by the base station to give the mobile station information about frequency references and is used for a frequency correction burst. The synchronization channel (SCH) is used by the base station to provide the mobile station synchronization training sequences. Further details regarding the GSM specification are disclosed in the detailed specification.

Therefore, it is apparent that there is a need in the art for a system and a method for analyzing the efficiency of the current configuration of a cellular system and identifying optimization changes for a cellular telephony system to maximize the bandwidth and minimize the co-channel interference.

SUMMARY OF THE INVENTION

The invention includes a GSM carrier decoder and GSM drive test analysis software, which are used in conjunction with each other to allow cellular service system operators to better design and operate their networks. The GSM drive test analysis software allows an engineer to optimize and frequency plan a large GSM network using only drive test measurements or modified measurements. The software furthermore allows a network to be modeled without disturbing its normal operation.

The GSM carrier decoder allows a signal level from every sector that is within 18 dB of the strongest signal on the carrier to be measured. Together, the GSM carrier decoder and the GSM drive test analysis software provides operators with a unique capability in maximizing the quality and capacity of the GSM network. Furthermore, it gives an operator unprecedented precision in the frequency planning process as it is based on extensive and accurate measurements.

The present invention includes a method of detecting a transmission from a primary cellular transmitter within a cellular network. The primary cellular transmitter transmits on at least one channel frequency and is surrounded by other transmitters within the cellular network. The method includes recording transmissions at a particular location within the cellular network for a minimum period of time. In one embodiment, the minimum period of time is the amount of time necessary to ensure the reception of a particular transmission from the primary cellular transmitter. In a GSM embodiment, the minimum particular time is 89 burst times. Although the particular location is within the footprint of the primary cellular transmitter, it is also subject to receiving transmissions from one or more secondary cellular transmitters.

Once the transmissions are recorded, a fast Fourier transform is performed on the recorded transmissions to generate a frequency domain representation of the recorded transmissions. This frequency domain representation of the recorded transmissions is then examined by measuring the peak signal level at a particular offset from each channel frequency. The offset is the spectral location that an unmodulated signal would appear from the frequency. Finally, the largest peak signal is identified as the transmission from the primary cellular transmitter. In the GSM embodiment, this would be the forward control channel for the primary cellular transmitter.

In a specific embodiment of the present invention, the fast Fourier transform is band limited to a bandwidth of approximately 500 Hz and a time period ranging from ½ to ⅔ of the time required to transmit a burst.

DETAILED DESCRIPTION

One aspect of the present invention is a wireless communication test set (WCTS) that is capable of receiving and processing signals over a wide frequency tuning range, as well as for a variety of cellular air interface protocols. Advantageously, this aspect of the present invention improves the ability to receive signals within a cell and analyze the signal for cochannel interference. Another aspect of the present invention is an analysis tool that can process data recorded by using the WCTS and identify co-channel interference problems. Another aspect of the present invention is by utilizing the WCTS and the analysis tool, to provide a business method that includes measuring the current signal characteristics of a cellular system, modify the cellular system based on the analysis of these signal characteristics, identify improvements in the performance of the cellular system attributed to these changes, and charge the service provider for the cellular system based on the these performance improvements.

Now turning to the figures where like numbers refer to like elements throughout the several views, various embodiments and aspects of the present invention will be described in more detail. Although the present invention may be applied within a variety of cellular systems having varying technology, the present invention will by primarily described as operating within a GSM cellular network. Any variants that are necessary to utilize the present invention within a different cellular network is also described.

Figure 1:
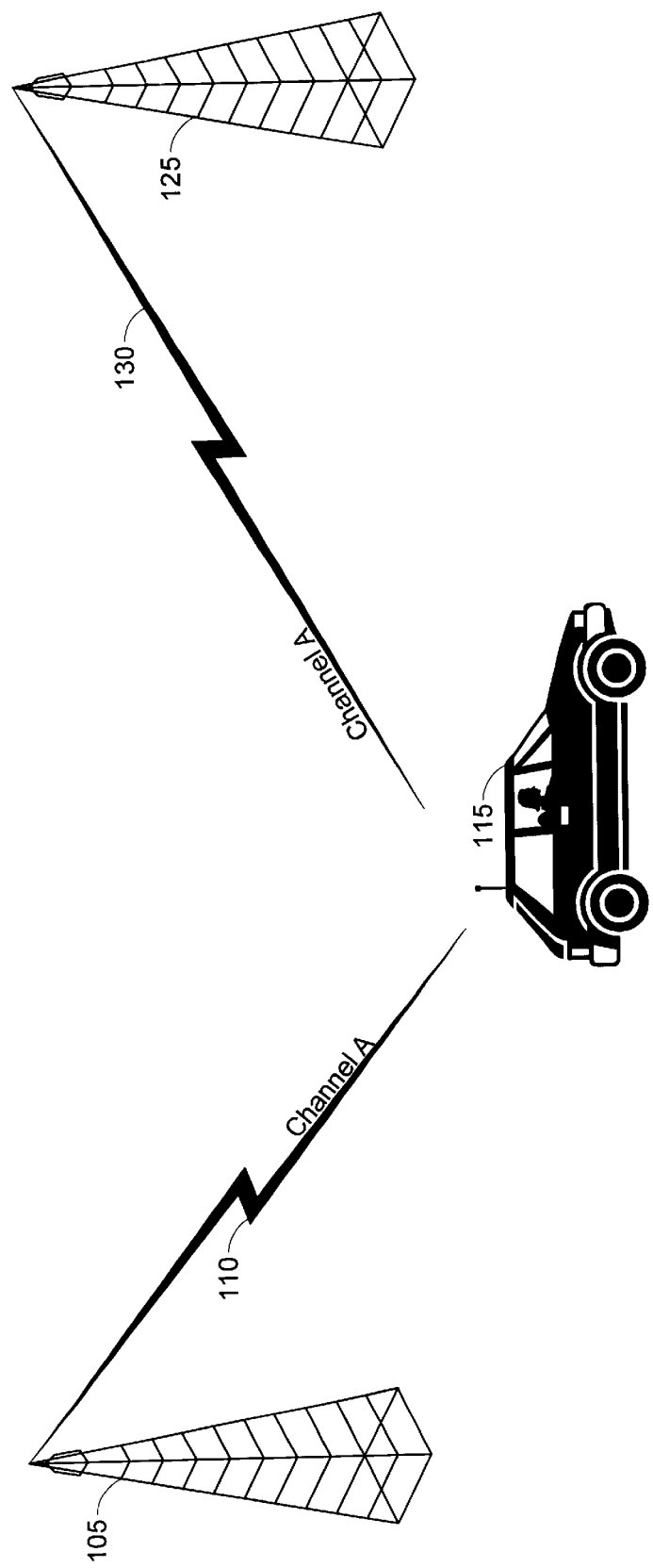
FIG. 1 is a system diagram illustrating co-channel interference within a cellular telephony system.

FIG. 1 is a system diagram illustrating co-channel interference within a cellular telephony system. A first cellular transmitter-receiver (cell site) 105 transmits information on one if its assigned cellular channels (channel A) 110 to a cellular receiver 115 within the geographic region 120 covered by the first cell site 105. During operation, the cellular receiver 115 will lock onto channel A and receive the transmitted information. However, if the system operator assigns the same channel A to a second cell site 125, the transmitted signal 130 from the second cell site 125 may interfere with the signal 110 of the first cell site 105. Although the cellular receiver 115 may be capable of locking onto the signal 110 from the first cell site 105, the signal 130 from the second cell site 125 may result in corrupting the information received by the cellular receiver 115. In this situation, the service operator for the cellular system should reduce the potential co-channel interference. This can be accomplished in several methods including, but not limited to decreasing the radiated power of the second cell site 125 for channel A, removing channel A from the list of channels for the second cell site 125, redirecting the signal 130 transmitted by the second cell site 125 by using sectoring techniques or adjusting the aim of the antenna.

Figure 2:
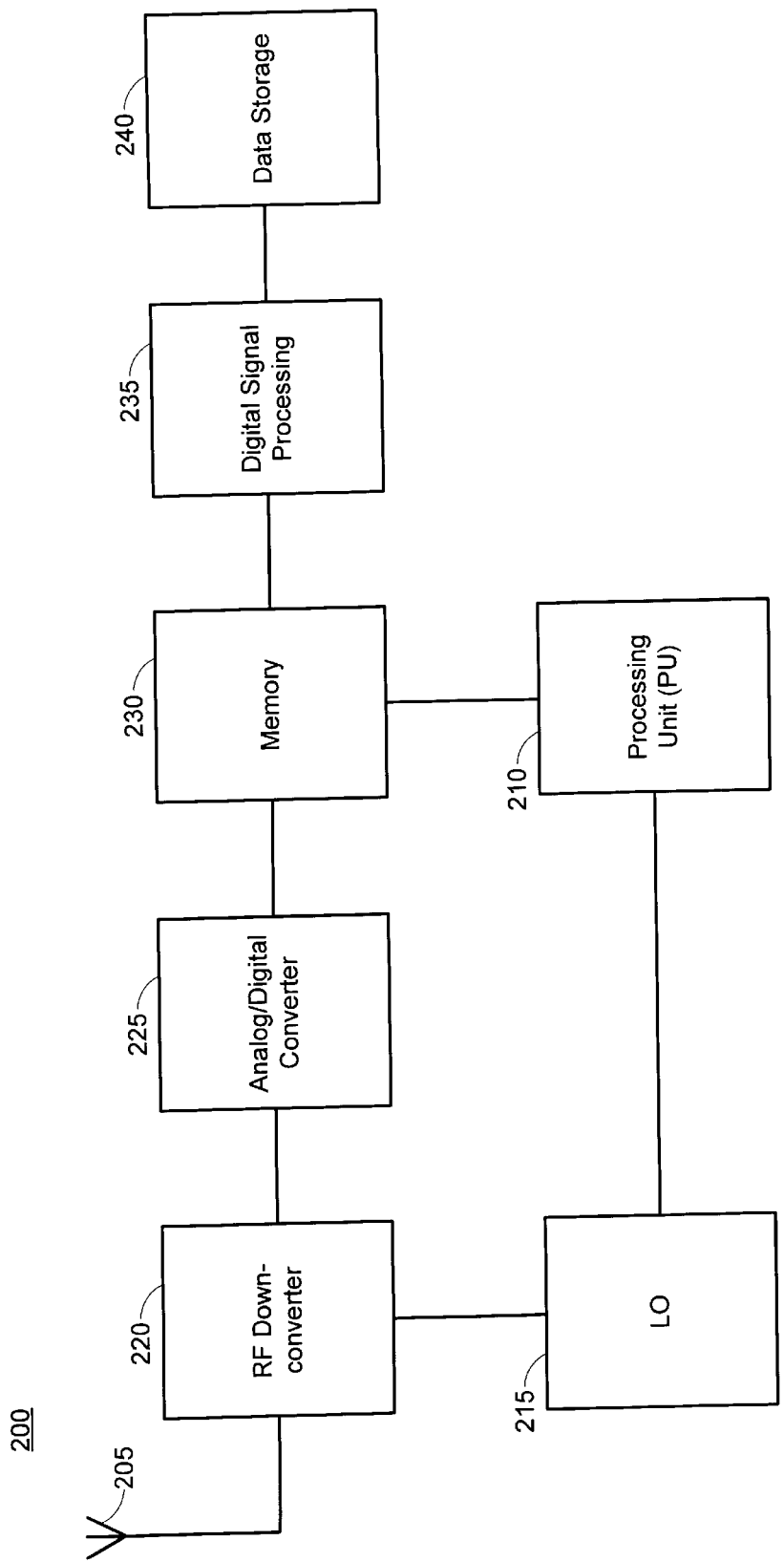
FIG. 2 is a block diagram illustrating the components included in the wireless communication test set (WCTS) aspect of the present invention.

The present invention allows the signal properties of an entire cellular system to be characterized and analyzed for co-channel interference. FIG. 2 is a block diagram illustrating the components included in the wireless communication test set (WCTS) aspect of the present invention. The WCTS is a data collection tool that measures the received signal energy or spectral power density and signal characteristics at a particular location. The WCTS is capable of receiving and processing signals over a wide frequency tuning range, as well for a variety of cellular encoding techniques (e.g., AMPS, GSM, CDMA (IS-95), TDMA (IS-136) and PCS (PCS1900)).

The WCTS 200 receives signal energy at antenna 205. A processing unit 210 controls the overall operation of the WCTS 200. One operation of the processing unit 210 is to tune a local oscillator (LO) 215 to a particular frequency. The LO 215 controls the signal selectivity of a radio frequency (RF) down converter 220. The RF down converter 220 receives the RF signal energy from the antenna and down converts it to an intermediate frequency (IF) of 10 MHz that is ban-limited to 10 MHz. The 10 MHz wide signal should contain fifty (50) GSM carriers, each of which have a bandwidth of approximately 270 kHz and a carrier spacing of 200 kHz. The IF is passed to an analog to digital converter 225 to digitize the signal. The digitized signal is then stored into a memory storage element 230. A digital signal processor 235 is used to process the collected information to extract system characteristic data which is then stored into a data storage element 240.

Utilizing the WCTS, extensive drive test data may be collected. This data is then used in the analysis of the cellular system. The present invention also uses predictive methods in conjunction with the drive test data. For instance, the effect of changes in antenna configuration, antenna models, or output power levels to any sector at any particular point in the network, can be estimated by calculating a predictive delta in the dB for that point between the original configuration and the new configuration. This delta can then be applied to the drive the test data to accurately model the effect of these changes. In addition, as input to the analysis of the cellular system, the longitude and latitude of the various transmitters are known. Each of the measurements made by the WCTS are stored with longitude and latitude information. When measuring signals close to a base station, the longitude and latitude measurements provide verification that the measured signal is coming from the base station. However, when measuring signals at a substantial distance from any of the base stations in the system, the longitude and latitude information does not provide such verification. In these situations, timing information extracted from the recorded signals are used to determine which base station transmitted the signal.

This is a highly accurate method for predicting the effect of optimization changes in cellular network before the changes are actually performed. This method is especially useful in analyzing large scale RF configuration changes as part of the capacity maximization effort. Also, in using the test drive data as a basis for determining channel reuse, the present invention allows for more accurate frequency plans to be developed.

In a cellular network, each cell site includes at least one base station. In a GSM based cellular network each base station transmits information on at least one, and often times multiple carriers (also referred to as frequencies or channels). One of the channels assigned to each GSM base station includes a broadcast control channel (BCCH). The BCCH is used to provide configuration or control information to enabled GSM cellular receivers within the cell site. The configuration information, among other things includes the identification for the base station and channel structure information for the cell site. A cellular receiver must tune to and lock onto the BCCH of a base station upon entering a cell site. The BCCH identifies the control channels used by the base station by including this information in time slot zero the BCCH carrier.

Figure 3:
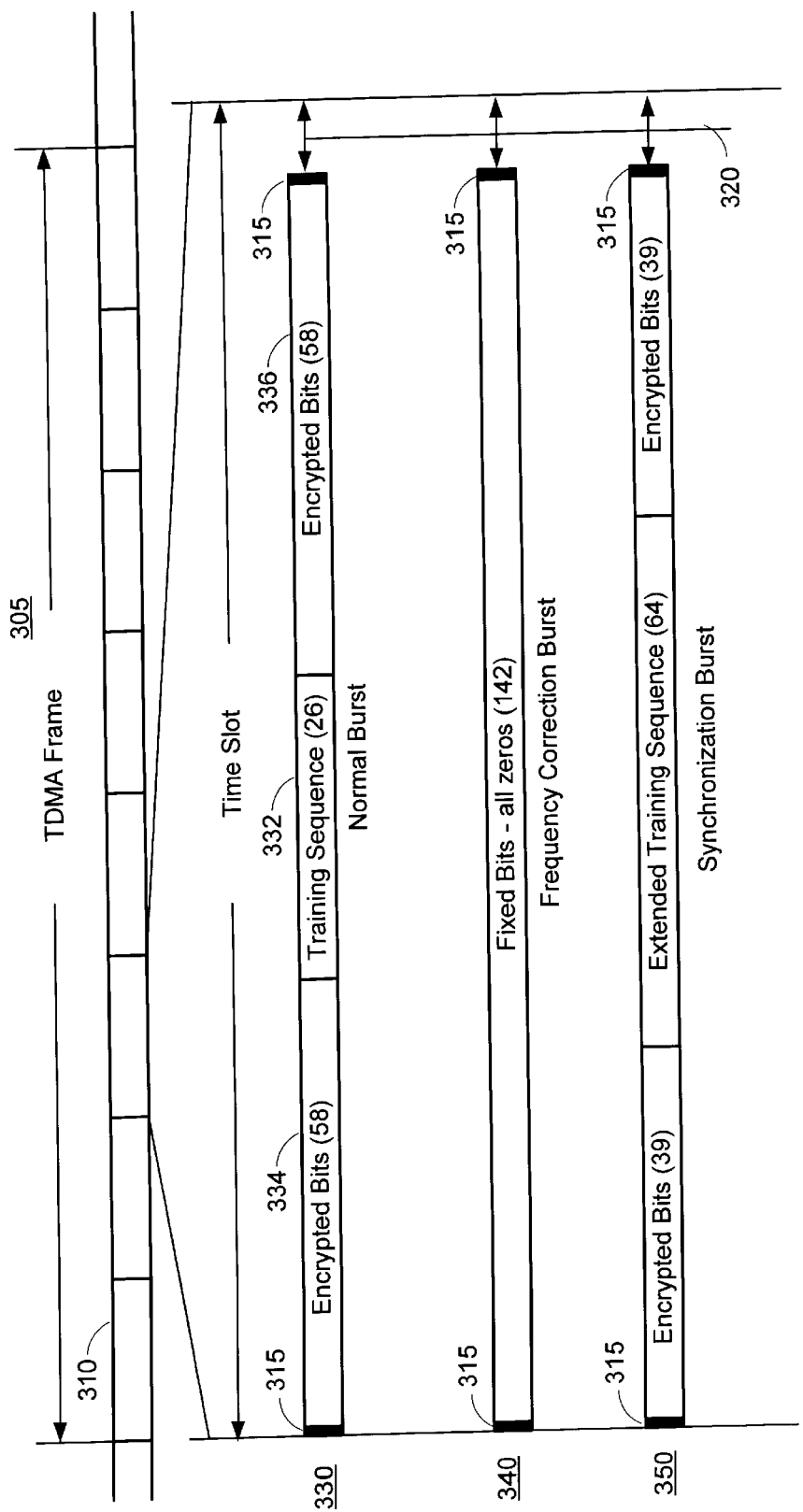
FIG. 3 is a timing diagram illustrating the various burst structures within a GSM system.

The data broadcast during a time slot is called a burst. Different channel types within the GSM architecture have different burst structures. FIG. 3 is a timing diagram illustrating the various burst structures within a GSM system. GSM systems transmit data using TDMA technology. A TDMA frame 305 includes multiple time slots 310. Each time slot in the GSM architecture includes 142 bits of data surround by three (3) tail bits 315 on each end of the data. On the trailing end of the data, a guard period of 8.25 bit periods 320 is provided. A normal burst 330 includes a 26 bit training sequence 332 preceded by, and followed by fifty-eight (58) encrypted bits 334 and 336. A fixed frequency correction burst 340 includes 142 bits of all zeros. A synchronization burst includes sixty-four (64) bit extended training sequence preceded by, and followed by thirty-nine (39) encrypted bits.

Each cell within a GSM system has one primary carrier and possible multiple secondary carriers. The BCCH resides in slot 0 of the primary carrier. The GSM BCCH and traffic channels (TCH) are configured as normal bursts. The forward control channel (FCCH) uses a burst of all zeroes resulting in an unmodulated carrier of 1625/24 KHz (or approximately 67 KHz) above the center carrier. The SYNCH, another GSM channel, uses the synchronization burst. The sixty-four (64) bit training sequence is a known sequence and contains the base station color code, or BCC. To a cellular receiver, while moving from location, the base stations are identified primarily by their BCCH carrier number and their BCC. The BCC is three bits long allowing for a total of eight (8) possible BCC values. In addition, the GSM specification utilizes a training sequence. The training sequence is a deterministic pattern that is based on one of the possible eight BCC values. One aspect of the present invention is a method to utilize the training sequence to identify the BCC, and thereby to identify the base station.

Figure 4:
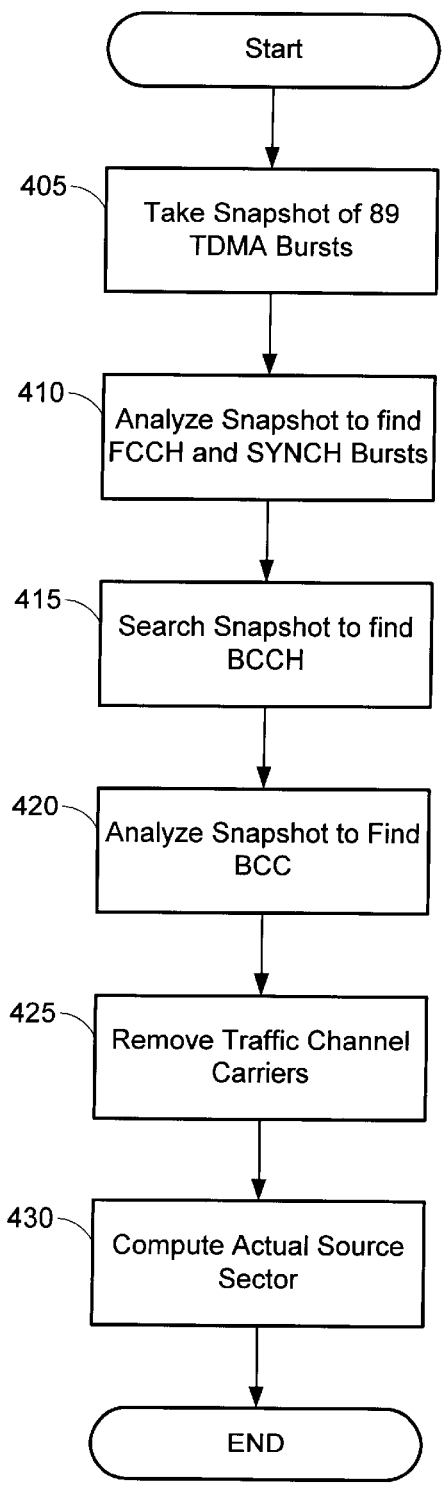
FIG. 4 is a flow diagram illustrating the operation of an exemplary embodiment of the present invention.

FIG. 4 is a flow diagram illustrating the operation of an exemplary embodiment of the present invention. Initially, the WSCT makes a snapshot of the received signal for eighty-nine (89) TDMA bursts 405. Based on the air interface protocol of the GSM architecture, an eight-nine (89) burst snapshot will include at least one SYNCH burst and one FCCH burst. Due to the fact that each TDMA burst is 0.577 milliseconds in duration, the snapshot will have a duration of 51.3 milliseconds. The analog to digital converter 225, in an exemplary embodiment operates at fifty (50) million samples per second with each sample being twelve (12) bits. Thus, the entire snapshot is 30,807,692 bits (3,850,962 bytes) in length.

The snapshot is then analyzed by the digital signal processor 235 to find the FCCH and SYNCH bursts 410. This task can be performed using a variety of techniques. One such technique is to perform a Fast Fourier Transform on the sample. Because the FCCH burst is a stream of zeroes, the carrier for the FCCH will be unmodulated and thus, will appear at 67 kHz above the nominal frequency. By examining a small band around each carrier frequency (i.e., around 67 kHz above the nominal frequency) the FCCH can then be identified. In the preferred embodiment, the Fast Fourier Transform should be bandwidth limited to less than 500 Hz and the time period should be ½ to ⅔ of a burst duration. For each carrier within the snapshot, the signal level and timing of the burst should be identified and recorded. It should be noted that more than one FCCH may appear in the snapshot.

Another technique to find the FCCH and SYNCH bursts is to multiply the snapshot by a sine wave having a frequency of 1,625/24 kHz above the nominal frequency. Because the FCCH is a string of zeros resulting in an unmodulated carrier at 67 kHz above the nominal frequency, this multiplication will recover the FCCH.

Regardless of the technique used to find the FCCH and SYNCH bursts, the snapshot is demodulated or searched to find a BCCH 415. Within the GSM system, to ensure that a signal is always broadcast on the BCCH carrier, dummy bursts are sent on the BCCH carrier whenever there is no traffic channel information to be sent. The dummy burst is a known 156 bit sequence. Transmission of the dummy burst allows the ability to find the BCCH carrier and read its signal level in a high noise environment. The dummy burst is sent only on idle time slots of the BCCH carrier. Those skilled in the art will be aware that the dummy burst is well known data sequence. Therefore it is easier to find, detect (demodulate). Furthermore, since the dummy burst is only send on the BCCH carrier, detecting the dummy burst is a clear indication that the BCCH carrier has been identified.

The snapshot is then analyzed to determine the base station color code (BCC) 420. This is a two step process that first involves demodulating the SYNCH to decode the BCC. Each carrier within the snapshot within a particular threshold of the peak level of the signal should be demodulated. There may be snapshots that include two or more FCCH bursts, each coming from two different base stations that utilize the same frequency. Each of these carriers needs to be considered. Each carrier meeting the threshold requirements is then filtered, demodulated and stored as an I Q data stream. If the distortion of a carrier is above a threshold value, the BCC data determined as described above will be unreliable. The distortion is detected based on the number of bit errors appearing in the known SYNCH sequence. In this case, an alternative technique may be used to determine the BCC. The alternative technique involves examining the extended training sequence 352 of the SYNCH burst. The extended training sequence includes a three bit field used to identify which twenty-six (26) bit training sequence is used for a normal burst. At this point in the process, timing has been determined for each BCCH carrier and the signal level and distortion of the BCCH carrier has been determined from the SYNCH.

If two BCC's in the snapshot seem like possible candidates as a valid BCC, then traffic channel carriers must be eliminated as possible matches 425. One of the BCC's may come from a non-BCCH carrier using the same BCC. To identify these, the training sequence is examined during the FCCH and SYNCH. We have already determined that a BCCH carrier is present and we have found the FCCH. In this step we are trying to eliminate the possibility that we have found a color code or training sequence from a traffic channel on the same frequency. This may occur often within the system. If we have found training sequences A and B, then one of the training sequences is likely to have come from a traffic channel carrier from another sector. If we look at the FCCH and SYNCH, we will not find the training sequence from the BCCH carrier, because the FCCH and SYNCH have their own structures. If we detect training sequence B during this time, then training sequence B comes from another sector and training sequence A is the one we are concerned with. If the training sequence appears, then it must not be the training sequence of the BCCH carrier. It is also possible that a normal burst from a non-BCCH carrier may appear at the same timer (i.e., within 4 chips) as a normal burst from the desired BCCH carrier with the same BCC. This could mean that the correct BCC could be thrown out (depending on the signal level) because the training sequence would appear during the FCCH and SYNCH. However, the probability of this occurring is quite small.

Finally, using the carrier frequency, the BCC and the timing of the FCCH, the process computes the actual source sector 430.

In an alternate embodiment of the present invention, rather than detecting and using the carrier frequency, the BCC and the timing of the FCCH, a separate signal can be broadcast from each bast station in the cellular system. The separate signal may then be detected and used to determine the originating sector and the signal strength of the base station within that sector. Advantageously, this technique allows the present invention to be utilized in any cellular system regardless of the underlying technology. One technique is to reserve one or more channels within the cellular system and use these channels to transmit the separate signal. By using various frequencies or coding techniques, a large number of unique signals can be generated thereby making it easier to identify the transmitting base station with certainty.

Another aspect of the present invention is to utilize the recorded signal information to optimize the cellular network. This is accomplished in the present invention through the cellular network optimization analysis software (analysis software). In general, the analysis software assigns signal level measurements to the base stations within the cellular network. By using the BCC, the timing of the received signal, the angle of arrival of the received signal, and the predicted signal levels for the base station, the reliability of assigning the signal level measurements can be increased. For instance, knowing the BCC of the received signal decreases the number of possible base stations that transmitted the received signal by a 7/8 ratio due to the fact that eight (8) possible BCC's can be received. In addition, measuring the delay or relative delay of a signal allows the analysis software to reduce the number of possible sources of the signal. Likewise, the angle of arrival of a received signal can help identify the general area of the originating base station. Finally, by predicting the signal level of the various base stations and comparing the actual signal levels received with the predicted levels, the most likely source of a signal can be identified.

The analysis software includes the ability to estimate receive signal levels of the base stations in response to changing the configuration of the base stations antenna. The analysis software estimates the signal level that would be received given changes in a base stations configuration. The software uses the change in predicted signal level from the two different configurations and applies that difference to the measured data to vie a predicted measured data.

Figure 5:
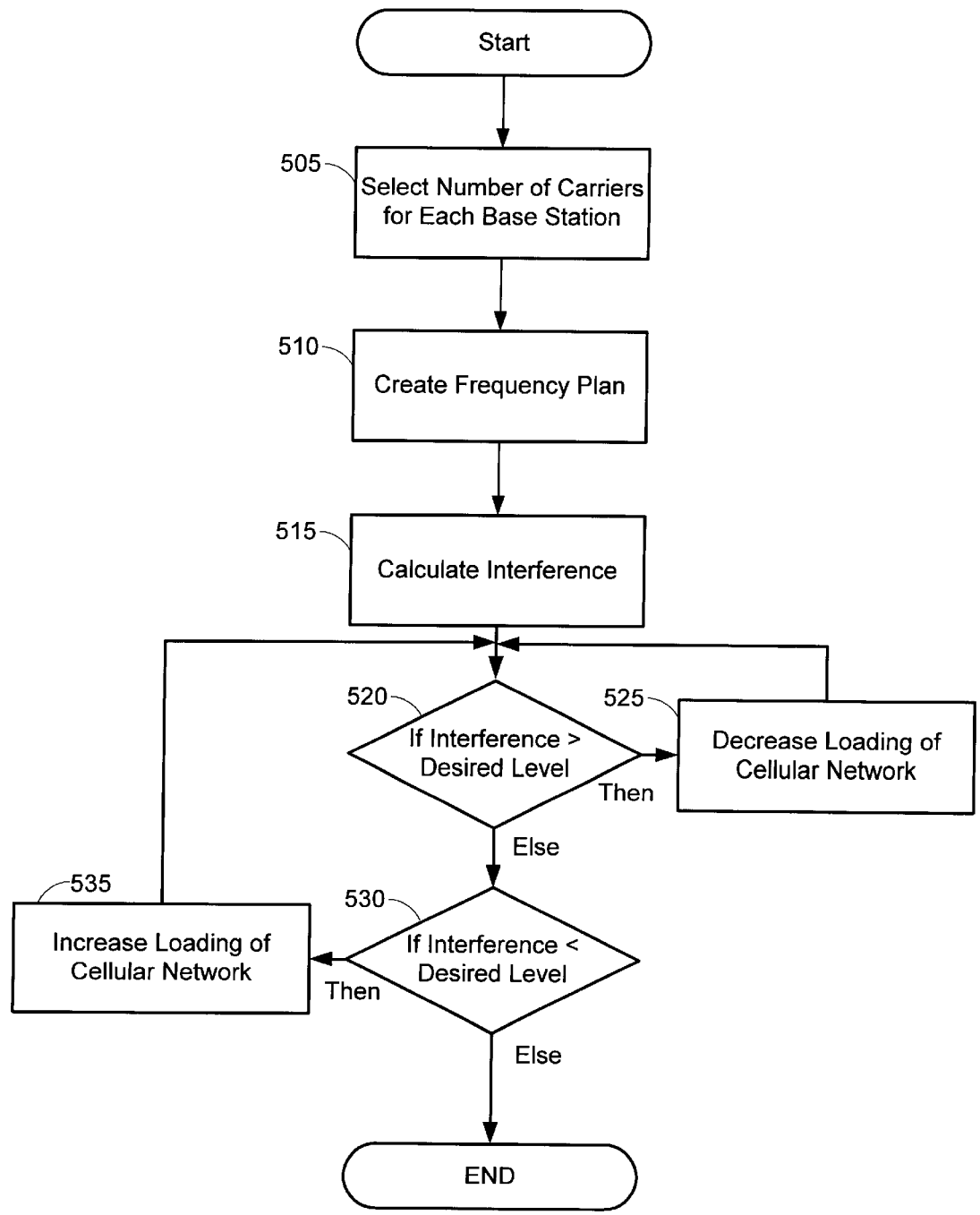
FIG. 5 is a flow diagram illustrating the steps involved in an exemplary embodiment of the capacity calculation aspect of the present invention.

The analysis software includes functionality to calculate the capacity of the cellular network. The calculation is based on the known loading characteristics of the base station, the network configuration, the measurements of the signal level from each base station, an automatic frequency planning module included within the analysis software, and an interference/efficiency goal or target. FIG. 5 is a flow diagram illustrating the steps involved in an exemplary embodiment of the capacity calculation aspect of the present invention. Initially, the number of carriers or channels to be assigned to each base station is selected 505. This number is selected based on the targeted loading of subscribers for the network and the known loading of each base station. In one embodiment, the channels can be allocated based on average estimates of the loading parameters.

We have a known ratio of loading between sectors. We have a table of the percentage of the total network loading with each sector. The total sums to 100%. As we increase the simulated loading of the network, in subscribers, we re-calculate the loading of each sector.

Next, a frequency plan is created based on the number of carriers needed for each base station 510. This is, at least in part facilitated through the use of a frequency assignment algorithm. Those skilled in the art will be familiar with the variety of frequency assignment algorithms that currently exist within the industry. The interference within the cellular network is then calculated by comparing the signal levels of the base stations throughout the network for co-channel base stations 515. Those skilled in the art should understand that once the signal characteristics of the base station are determined, the calculations for various configurations can be determined without having to measure the signal characteristics again. Finally, if the interference level of the network is compared to a desired level. If the interference level is above a desired level 520, the loading of the cellular network can be decreased 525. However, if the interference level is below the desired level 530, the cellular network loading can be increased. If the loading of the cellular network is right at the desired level, processing stops.

Another aspect of the present invention is being able to estimate the difference in capacity given two different cellular network configurations. In this aspect of the present invention, the capacity for the two configurations are calculated using the process described in conjunction with FIG. 5. Upon completion, the capacity of the two network configurations can be compared to each other to determine the optimal network configuration.

Another aspect of the present invention is using the signal to total power received ratio to provide a technology independent estimate of quality of the network design. This aspect of the present invention may also be used to determine areas within the network with the highest interference. Traditionally, interference is calculated in each area of a network based on the implemented frequency plan. This has been done due to the fact that the areas of interference change as the frequency plan changes. However, the present invention allows the system operator to quantify the areas of the network that are likely to have interference problems, regardless of the frequency plan. This aspect of the present invention involves, at each area within the cellular system, calculating the total power received from every base station in the cellular system. Next, the power of the strongest base station for each particular area is compared to the total power received for that particular area. The ratio of these values will range from 0 to 1, or negative infinity to zero when expressed in dB. Frequency assignments are independent of this calculation. The total power received in a location is not the actual power at that location on a given frequency, but rather the total power from all sectors regardless of there frequency assignment.

Figure 6:
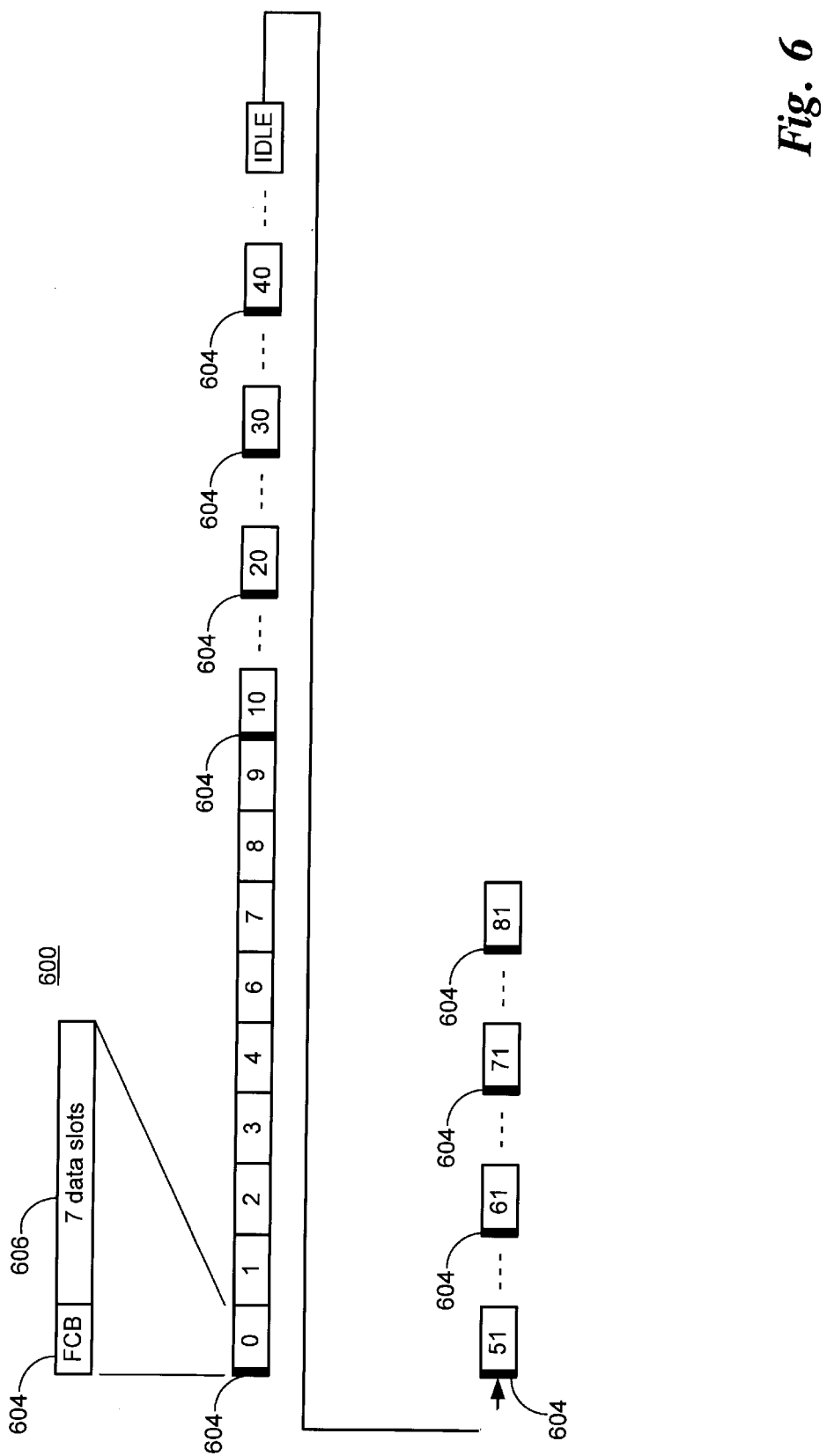
FIG. 6 is a timing diagram illustrating the FCCH detection aspect of the present invention.

FIG. 6 is a timing diagram illustrating the FCCH detection aspect of the present invention. The FCCH is transmitted on the BCCH and appears in slot zero of certain of the TDMA frames. An FCCH loaded TDMA frame 600 includes a frequency correction burst 604 and seven data slots 606. To detect the FCCH, 89 bursts of data are recorded, thereby ensuring that the FCB is detected. It is necessary to record 89 bursts due to the fact that the FCB appears only once in every 11 frames. Thus in frame 0, 10, 20, 30, 40, and 50, the FCB appears in slot zero. Periodically, after frame 50, the GSM'system will include an idle time in which a handoff or other functions can be performed. Thus, the FCB is resumed in frames 51, 61, 71, and 81. To ensure that a recorded sample includes at least one FCB, the worst case scenario must be taken into account. Thus, 89 burst will include 11 frames and one extra time-slot. This will ensure that in the worst case scenario—beginning a recording in the middle of burst that expands across an idle—at least one FCB is recorded. Traditionally, a mobile unit is provided with the BCC identifying the base station to be tuned to for receiving information. The mobile unit is then aware of which training sequence of the eight possible training sequences to look for. The present invention takes advantage of the fact that the training sequence identifies a particular base station. By capturing the training sequence and correlating the captured training sequence with the 8 possible training sequences, the BCC can be determined. Stated otherwise, the transmitting base station of the received signal can be identified.

What is claimed is:

1. A method of correlating transmission data received from cellular transmitting devices, the method comprising the steps of:

receiving a first stream of transmission data having a first received signal frequency for a first period of time;

correlating the first transmission data against a signal template to identify a first FCCH burst frame;

identifying first FCCH time data corresponding to the first FCCH burst frame;

receiving a second stream of transmission data having a second received signal frequency for a second period of time;

correlating the second transmission data against a signal template to identify a second FCCH burst frame;

identifying second FCCH time data corresponding to the second FCCH burst frame; and analyzing the first FCCH time data and the second FCCH time data to determine whether the first FCCH time data correlates to the second FCCH time data.

2. The method of claim 1, further comprising the steps of:

identifying a first training sequence received as part of the first stream of transmission data; and identifying a first base station color code associated with the first training sequence.

3. The method of claim 2, further comprising the step of:

identifying a transmitting base station associated with the first base station color code.

4. The method of claim 1, wherein the first FCCH time data corresponds to the second FCCH time data if the second FCCH time data represents a time frame occurring a multiple of 51 time frames apart from the first FCCH time data.

5. The method of claim 1, wherein the first FCCH time data corresponds to the second FCCH time data if the second FCCH time data represents a time frame occurring 10 time frames from a time frame occurring a multiple of 51 time frames apart from the first FCCH time data.

6. The method of claim 1, wherein the first FCCH time data corresponds to the second FCCH time data if the second FCCH time data represents a time frame occurring 11 time frames from a time frame occurring a multiple of 51 time frames apart from the first time data.

7. The method of claim 1, wherein the first FCCH time data corresponds to the second FCCH time data if the second FCCH time data represents a time frame occurring 20 time frames from a time frame occurring a multiple of 51 time frames apart from the first time data.

8. The method of claim 1, wherein the first FCCH time data corresponds to the second FCCH time data if the second FCCH time data represents a time frame occurring 21 time frames from a time frame occurring a multiple of 51 time frames apart from the first time data.

9. The method of claim 1, where the first period of time is of sufficient duration to record sixty-two frames of transmission data.

10. The method of claim 1, wherein the signal template comprises an FCCH Burst and a SYNCH training sequence.

11. The method of claim 1, further comprising the steps of:

identifying the first signal frequency of the first stream of transmission data; and identifying the second signal frequency of the second stream of transmission data.

12. The method of claim 11, further comprising the steps of:

determining that the first and second streams of transmission data were sent from the same base station if the first FCCH time data correlates to the second FCCH time data and the first signal frequency is approximately equal to the second signal frequency.

13. The method of claim 1, further comprising the step of:

determining that the first and second streams of transmission data were transmitted from the same base station if the first FCCH time data correlates to the second FCCH time data.

* * * * *

(12) EX PARTE REEXAMINATION CERTIFICATE (6937th)
United States Patent
Sanders et al.

(10) Number: US 6,754,487 C1
(45) Certificate Issued: *Jul. 14, 2009

(54) RADIO NETWORK TEST ANALYSIS SYSTEM

(75) Inventors: Alan David Sanders, Atlanta, GA (US); Perry Simon Lewars Linder, Chevy Chase, MD (US); Thomas Gregory Pratt, Covington, GA (US); Anthony Jerome Dickherber, Atlanta, GA (US); Timothy Scott Floyd, Atlanta, GA (US); Leslie Westhaver Pickering, Atlanta, GA (US)

(73) Assignee: Netstart, Inc., Atlanta, GA (US)

Reexamination Request:
No. 90/008,750, Jun. 21, 2007

Reexamination Certificate for:
Patent No.: 6,754,487
Issued: Jun. 22, 2004
Appl. No.: 09/638,921
Filed: Aug. 15, 2000

(*) Notice: This patent is subject to a terminal disclaimer.

Related U.S. Application Data
(60) Provisional application No. 60/185,590, filed on Feb. 28, 2000.

(51) Int. Cl.
*H04Q 7/34* (2006.01)

(52) U.S. Cl. .......... 455/423; 455/67.11; 455/226.1; 455/425

(58) Field of Classification Search .......... None
See application file for complete search history.

(56) References Cited

U.S. PATENT DOCUMENTS 5,936,961 A * 8/1999 Chiodini et al. .......... 370/441
6,163,698 A * 12/2000 Leitch et al. .......... 455/450
6,931,235 B2    8/2005 Kline et al. .......... 455/67.11
7,301,920 B2 * 11/2007 Sanders et al. .......... 370/328

FOREIGN PATENT DOCUMENTS

WO    WO-01059936    *   4/2003

OTHER PUBLICATIONS

TSG–RAN Working Group 1, Meeting #4, Yokohama, Japan, Apr. 19–20, 1999, Agenda Item: Simulation Results for Parallel GSM Synchronization, pp. 1–5.

TSG–RAN Working Group 1, Meeting #7, Hannover, Germany, Aug. 30–Sep. 3, 1999, Agenda Item: Method and Algorithm for GSM cell reconfirmation, pp. 1–4.

Definition of "Cochannel interference," Newton's Telecom Dictionary, p. 167, 18th Ed., Feb. 2002.

* cited by examiner

*Primary Examiner*—Pia Tibbits

(57) ABSTRACT

Optimization of a cellular network is facilitated by an apparatus that performs drive test measurements of a cellular network to identify co-channel interference. The co-channel interference is identified by measuring the signal strengths at various locations within a cell sector and analyzing the recorded information. A key aspect of the invention is synthesizing the received signals to identify the cellular transmitters originating the signals. If signal energy is detected from more than one cellular transmitter on a single frequency, the co-channel interference is identified. This process is particular well suited within a GSM cellular system by detecting the transmission of forward control channel messages and using the information within the forward control channel messages to identify the origination cellular transmitters.

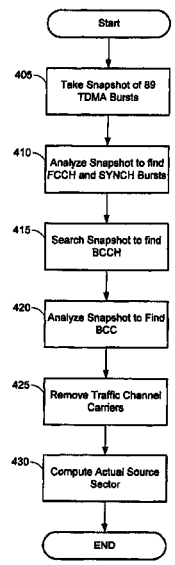

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *